United States Patent
Lee et al.

(10) Patent No.: US 12,388,157 B2
(45) Date of Patent: Aug. 12, 2025

(54) RECHARGEABLE BATTERY PACK

(71) Applicant: Samsung SDI Co., Ltd., Yongin-si (KR)

(72) Inventors: Hyeok Lee, Yongin-si (KR); Beomjoo Kim, Yongin-si (KR); Jaeho Kim, Yongin-si (KR); Kilseok Lee, Yongin-si (KR); Du-Seong Jeon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/306,775

(22) Filed: May 3, 2021

(65) Prior Publication Data

US 2021/0384591 A1  Dec. 9, 2021

(30) Foreign Application Priority Data

Jun. 5, 2020 (KR) .................. 10-2020-0068339

(51) Int. Cl.
*H01M 50/507* (2021.01)
*H01M 10/6556* (2014.01)
(Continued)

(52) U.S. Cl.
CPC ..... *H01M 50/507* (2021.01); *H01M 10/6556* (2015.04); *H01M 10/6568* (2015.04); *H01M 50/213* (2021.01)

(58) Field of Classification Search
CPC ........... H01M 10/643; H01M 10/6556; H01M 10/6568; H01M 50/503; H01M 10/613;
(Continued)

(56) References Cited

U.S. PATENT DOCUMENTS

| | | | |
|---|---|---|---|
| 2003/0134189 A1* | 7/2003 | Kanai | H01M 10/6563 429/120 |
| 2012/0003522 A1* | 1/2012 | Fuhr | H01M 10/6551 429/120 |

(Continued)

FOREIGN PATENT DOCUMENTS

| | | |
|---|---|---|
| CN | 107223290 A | 9/2017 |
| CN | 108780862 A | 11/2018 |

(Continued)

OTHER PUBLICATIONS

Extended European Search Report for Application No. 21177655.4, mailed Nov. 4, 2021, 9 pages.

(Continued)

*Primary Examiner* — Miriam Stagg
*Assistant Examiner* — Lilia Nedialkova
(74) *Attorney, Agent, or Firm* — Womble Bond Dickinson (US) LLP (57) ABSTRACT

A rechargeable battery pack may include: a battery housing including an inner space; a series of unit battery cells accommodated in the inner space; a first bus bar configured to electrically connect the unit battery cells above the unit battery cells; a second bus bar configured to electrically connect the unit battery cells under the unit battery cells and contact a bottom plate of the battery housing in the inner space; and a cooling unit in the battery housing under the second bus bar configured to accommodate a cooling medium to flow therein for cooling the unit battery cells.

6 Claims, 7 Drawing Sheets

(51) Int. Cl.
  *H01M 10/6568* (2014.01)
  *H01M 50/213* (2021.01)
(58) Field of Classification Search
  CPC ............ H01M 10/6555; H01M 50/213; H01M 50/291; H01M 50/507; H01M 50/548; Y02E 60/10
  See application file for complete search history.

(56) References Cited

U.S. PATENT DOCUMENTS

| | | | |
|---|---|---|---|
| 2014/0295240 A1 | 10/2014 | Takeda et al. | |
| 2018/0083328 A1* | 3/2018 | Schaefer | H01M 10/615 |
| 2019/0074557 A1 | 3/2019 | Shin et al. | |
| 2019/0173064 A1 | 6/2019 | Lee et al. | |
| 2019/0214694 A1* | 7/2019 | Yang | H01M 50/512 |
| 2019/0334134 A1 | 10/2019 | Reingruber et al. | |
| 2019/0372069 A1 | 12/2019 | Lee et al. | |
| 2020/0044227 A1 | 2/2020 | Ryu et al. | |
| 2020/0321590 A1* | 10/2020 | Park | H01M 10/0422 |
| 2021/0098845 A1* | 4/2021 | Desbois-Renaudin | H01M 50/502 |
| 2021/0184303 A1* | 6/2021 | Lee | H01M 50/276 |

FOREIGN PATENT DOCUMENTS

| | | |
|---|---|---|
| EP | 3 651 236 A1 | 5/2020 |
| JP | 2014-191968 A | 10/2014 |
| JP | 2015-018643 A | 1/2015 |
| JP | 2017-091989 A | 5/2017 |
| JP | 2018-527705 A | 9/2018 |
| KR | 10-2018-0117033 A | 10/2018 |
| KR | 10-2019-0032887 A | 3/2019 |
| KR | 10-2019-0042341 A | 4/2019 |
| KR | 10-2019-0083533 A | 7/2019 |

OTHER PUBLICATIONS

Chinese Office action for Application No. 202110623672.8 dated Jul. 19, 2023, 20 pages.
Chinese Office action for Application No. 202110623672.8, mailed Feb. 1, 2023, 19 pages.
Chinese Decision of Rejection for Application No. 202110623672.8, issued Jan. 2, 2024, 18 pages.
Office action for European Patent Application No. 21177655.4, dated Feb. 28, 2024, 6 pages.

* cited by examiner

RECHARGEABLE BATTERY PACK

CROSS-REFERENCE TO RELATED APPLICATION

This application claims priority to and the benefit of Korean Patent Application No. 10-2020-0068339, filed in the Korean Intellectual Property Office on Jun. 5, 2020, the entire contents of which are incorporated herein by reference.

BACKGROUND

1. Field

The present disclosure relates to embodiments of a rechargeable battery pack with an increased cooling effect.

2. Description of the Related Art

A rechargeable battery can be repeatedly charged and discharged, unlike a primary battery. Small-capacity rechargeable batteries are used in portable small electronic devices such as mobile phones, notebook computers, and camcorders, whereas large-capacity rechargeable batteries are used as power sources for driving motors such as electric bicycles, scooters, electric vehicles, and fork lifts for example.

The rechargeable battery may be used as one unit battery cell, or it may be used as a rechargeable battery pack in which a plurality of unit battery cells are connected in parallel or in series in order to achieve a large capacity. For example, the rechargeable battery pack uses a tab for connecting the unit battery cells in series or in parallel, and may have a structure in which a current is drawn from one tab.

In the case of using a plurality of unit battery cells, the rechargeable battery pack should have a structure capable of effectively dissipating heat generated during charging and discharging for high output response, and a structure capable of effectively fixing the unit battery cells in response to shock and vibration.

On the other hand, since the rechargeable battery generates heat when charging and discharging operations are repeated, there is a problem in that the rechargeable battery may be damaged by heat.

The above information disclosed in this Background section is only for enhancement of understanding of the background of the invention and, therefore, it may contain information that does not form the prior art that is already known in this country to a person of ordinary skill in the art.

SUMMARY

An embodiment of the present disclosure has been made in an effort to provide a rechargeable battery pack that effectively cools and dissipates heat generated during charging and discharging of the rechargeable battery pack.

An embodiment of the present disclosure provides a rechargeable battery pack including: a battery housing including an inner space; a series of unit battery cells accommodated in the inner space; a first bus bar configured to electrically connect the unit battery cells above the unit battery cells; a second bus bar configured to electrically connect the unit battery cells under the unit battery cells and contact a bottom plate of the battery housing in the inner space; and a cooling unit in the battery housing under the second bus bar configured to allow a cooling medium to flow therein for cooling the unit battery cells.

The second bus bar may contact a lower surface of the unit battery cells.

The second bus bar may include: a bus bar plate positioned on a bottom plate of the battery housing in the inner space; a series of terminal protrusions protruding from the bus bar plate and electrically connected to electrode terminals of the unit battery cells; and a rib protrusion protruding from an upper portion of the bus bar plate and contacting a portion of a side surface of the unit battery cells.

The rechargeable battery pack may include at least one recess portion at a side surface of the rib protrusion that is in contact with the unit battery cells.

The rib protrusion may be integrally formed with the bus bar plate.

The rib protrusion may be coupled to the upper portion of the bus bar plate.

The rib protrusion may have a lower surface that is coupled to the bus bar plate, and a first side thereof has a bent portion that is bent to contact the side surface of the unit battery cells.

The unit battery cells may be fixed by a holder portion inside the battery housing.

The holder portion may include a series of through holes penetrating upper and lower portions of the holder portion, and the unit battery cells are accommodated in the plurality of through holes in the holder portion.

The second bus bar may include: a bus bar plate configured to face a bottom plate of the battery housing in the inner space; and a series of fixers protruding from a lower portion of the bus bar plate. The fixers include a series of interior spaces in which a lower surface and a portion of a side surface of each of the unit battery cells are positioned.

Bottom surfaces of the fixers may be in contact with the bottom plate of the battery housing in the inner space.

A filler may be filled between the bottom plate of the battery housing and the bus bar plate.

The filler may include a thermal glue.

The cooling unit may be a cooling channel formed inside the bottom plate of the battery housing.

According to the exemplary embodiment of the present invention, high-temperature heat generated during an operation of the unit battery cells may be transferred to the cooling unit through the bus bar. Therefore, it is possible to effectively cool the heat generated during the operation of the unit battery cells by the heat transfer action through the bus bar.

DETAILED DESCRIPTION

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
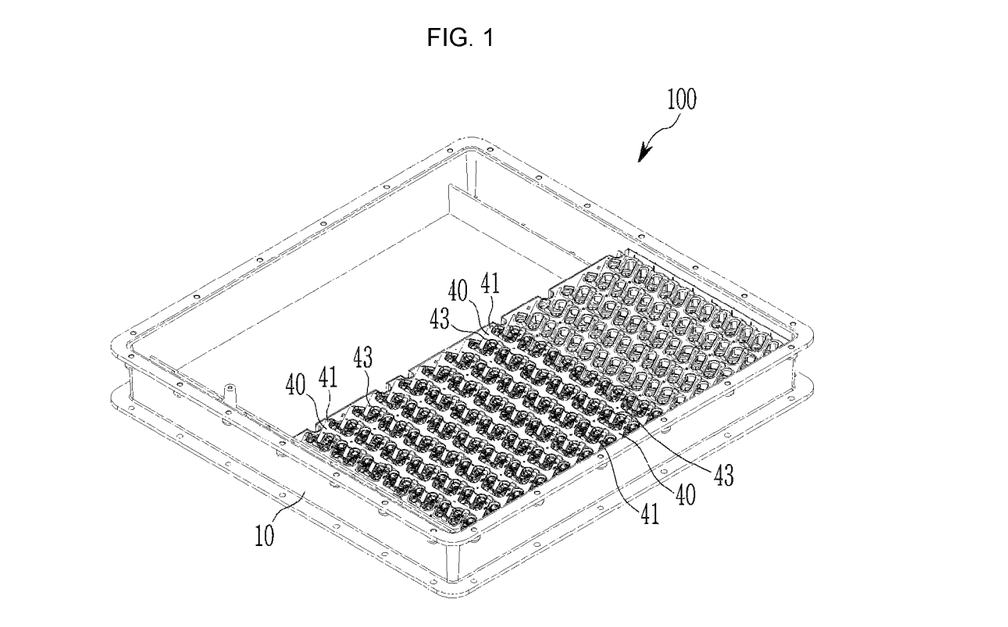
FIG. 1 illustrates a schematic perspective view showing a rechargeable battery pack according to a first embodiment of the present disclosure.
Figure 2:
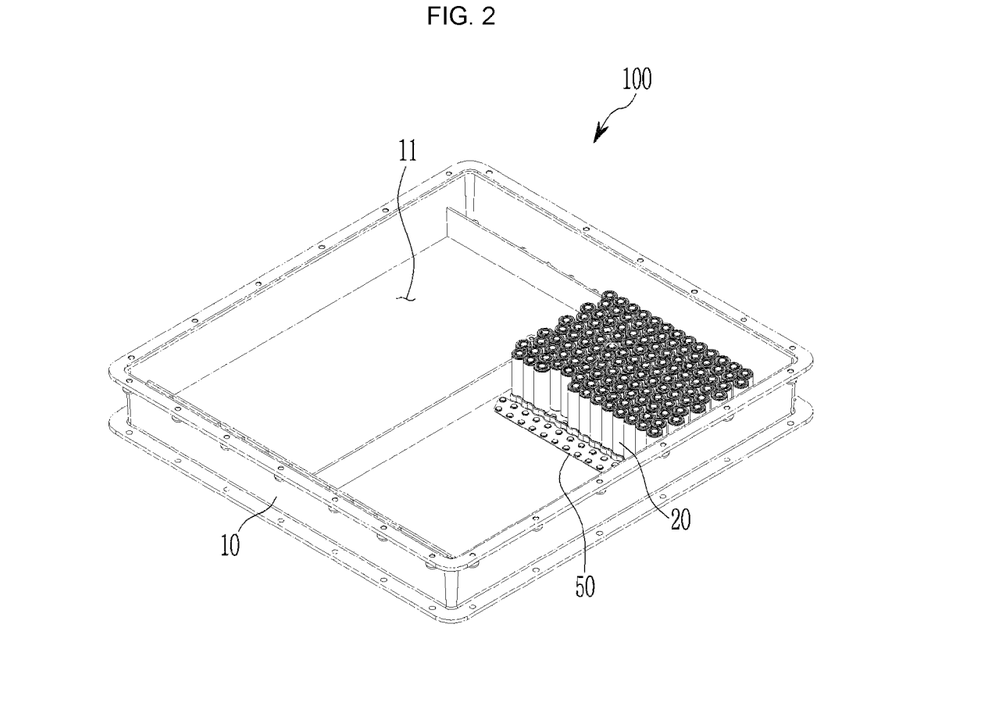
FIG. 2 illustrates a schematic perspective view showing a state in which some unit battery cells of the rechargeable battery pack of FIG. 1 are inserted into a battery housing.
Figure 3:
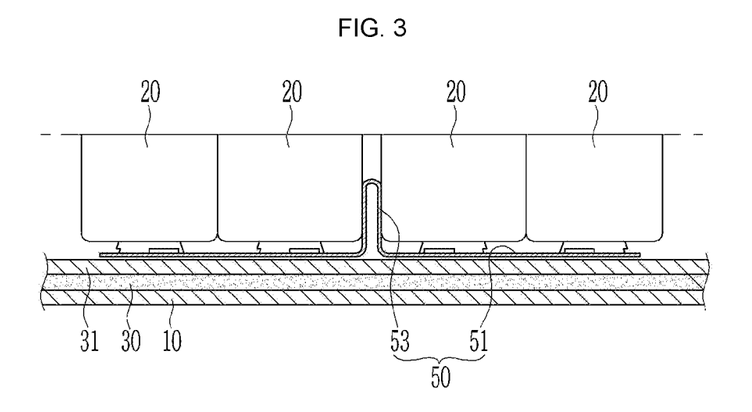
FIG. 3 illustrates a cross-sectional view schematically showing a state in which the unit battery cells are connected to a second bus bar and positioned on an upper side of a cooling unit that is positioned on a lower surface of the battery housing according to the first embodiment of the present disclosure.

FIG. 1 illustrates a schematic perspective view showing a rechargeable battery pack according to a first embodiment of the present disclosure, FIG. 2 illustrates a schematic perspective view showing a state in which some unit battery cells of the rechargeable battery pack of FIG. 1 are inserted into a battery housing, and FIG. 3 illustrates a cross-sectional view schematically showing a state in which the unit battery cells are connected to a second bus bar and positioned on an upper side of a cooling unit that is positioned on a lower surface of the battery housing according to the first exemplary of the present disclosure.

As illustrated in FIG. 1 to FIG. 3, the rechargeable battery pack 100 according to the first embodiment of the present disclosure includes: a battery housing 10 configured to have an inner space 11 formed therein; a plurality of unit battery cells 20 inserted into (accommodated in) the inner space 11; a first bus bar 40 configured to electrically connect the unit battery cells 20 at upper portions of the unit battery cells 20; a second bus bar 50 configured to electrically connect the unit battery cells 20 at lower portions of the unit battery cells 20; and a cooling unit 30 formed inside the battery housing 10 at a lower portion of the second bus bar 50 to cool the unit battery cells 20.

In the present embodiment, the battery housing 10 may have a rectangular parallelepiped shape, and an inner space 11 may be formed to have a corresponding parallelepiped shape. The battery housing 10 is described as having the rectangular parallelepiped shape in the present embodiment, but is not limited thereto, and may be changed into various shapes, such as a cylindrical shape.

The unit battery cells 20 may be accommodated in the inner space 11 of the battery housing 10.

The battery housing 10 may be sealed by using a cover unit (not illustrated) while accommodating the unit battery cells 20 therein.

The cooling unit 30 may be formed in the battery housing 10.

The cooling unit 30 may be formed inside the battery housing 10 at a lower portion of the inner space 11 of the battery housing 10. The cooling unit 30 may be formed as a cooling channel in the battery housing 10 such that a cooling medium (e.g., water) for cooling the unit battery cells 20 flows therein to properly cool and dissipate heat generated during operation of the unit battery cells 20.

The cooling unit 30 may be formed inside the battery housing 10 to have a lattice shape having a series of openings or channels in self-communication. The cooling unit 30 is not necessarily limited to the lattice shape, and the shape of the cooling unit 30 may be appropriately changed in according to an arrangement of the unit battery cells 20.

A bottom plate of the battery housing 10 may be formed as a bottom plate 31 made of aluminum. Cooling energy of the cooling unit 30 may be transferred to the second bus bar 50 in contact with a surface of the bottom plate 31 to achieve effective cooling of the unit battery cells 20 in contact with the second bus bar 50.

In one or more embodiments, each of the unit battery cells 20 may be formed as a conventional cylindrical rechargeable battery that is configured to repeatedly perform charging and discharging.

The unit battery cells 20 may be electrically connected through the first bus bar 40 at an upper position of the battery housing 10 in a state of being arranged in a plurality of columns and rows inside the battery housing 10.

The first bus bar 40 is located at a position between the unit battery cells 20 at an upper side of the unit battery cell 20, and a lead unit 41 connected to an electrode terminal may obliquely protrude from a side surface thereof.

The lead unit 41 may be electrically connected to the electrode terminal by a wire member 43.

Additionally, the unit battery cells 20 may be electrically connected through the second bus bar 50 at a lower position of the battery housing 10 in a state of being arranged in a plurality of columns and rows inside the battery housing 10.

The second bus bar 50 may be installed to be electrically connected to the unit battery cells 20 inserted into the inner space 11 of the battery housing 10. In the illustrated embodiment, the second bus bar 50 is in contact with not only bottom surfaces of the unit battery cells 20 but also a portion of the side surfaces of the unit battery cells 20, and thus the unit battery cells 20 may be effectively cooled by a cooling action of the cooling unit 30 installed under the bottom plate 31 of the inner space 11 of the battery housing 10.

Figure 4:
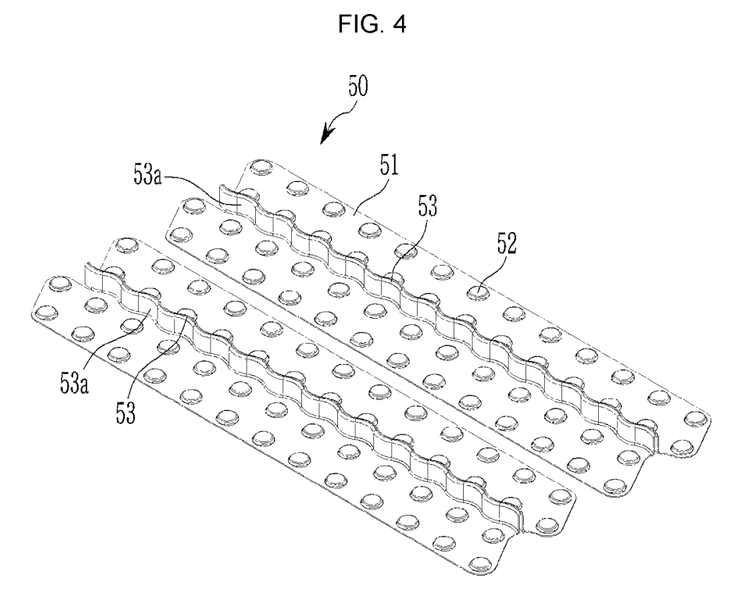
FIG. 4 illustrates a schematic perspective view showing the second bus bar according to the first embodiment of the present disclosure.
Figure 5:
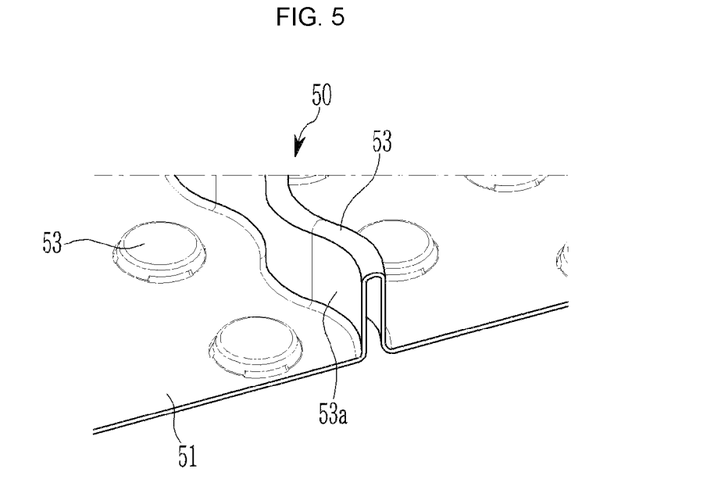
FIG. 5 illustrates a schematic perspective view of main parts of the second bus bar of FIG. 4.

FIG. 4 illustrates a schematic perspective view showing the second bus according to the first embodiment of the present disclosure, and FIG. 5 illustrates a schematic perspective view of main parts of the second bus bar of FIG. 4.

As illustrated in FIG. 4 and FIG. 5, the second bus bar 50 includes a bus bar plate 51 positioned in the inner space 11 of the battery housing 10, a series of terminal protrusions 52 protruding upward from the bus bar plate 51 and electrically connected to the electrode terminals of the unit battery cells 20, and a rib protrusion 53 protruding upward from the bus bar plate 51 to contact a portion of a side surface of the unit battery cells 20.

The bus bar plate 51 may be formed to have a plate shape (e.g., a planar shape) at opposite sides of the rib protrusion 53 positioned therebetween.

The bus bar plate 51 may be installed in surface contact with (e.g., direct surface contact) the bottom plate 31 installed along a bottom portion of the inner space 11 of the battery housing 10.

The terminal protrusions 52, which are electrically connected to the electrode terminals of the unit battery cells 20, may protrude from an upper surface of the bus bar plate 51.

A plurality of terminal protrusions 52 may protrude from the surface of the bus bar plate 51, and may be electrically connected to electrode terminals of the unit battery cells 20.

The rib protrusion 53 may protrude between the terminal protrusions 52 of the bus bar plate 51 (e.g., the rib protrusion 53 may extend between a first set of the terminal protrusions 52 and a second set of the terminal protrusions 52).

The rib protrusion 53, which protrudes above the bus bar plate 51 and to a position between the unit battery cells 20 so as to partially contact the side surface of the unit battery cells 20, may be integrally formed with the bus bar plate 51.

The rib protrusion 53 may be formed from a length-direction portion of the bus bar plate 51 being bent upward (protruding upward) and inserted into a position between the unit battery cells 20.

In one or more embodiments, the rib protrusion 53 may protrude from the upper side of the bus bar plate 51 such that a first side of the rib protrusion 53 contacts a side surface of one unit battery cell 20 and a second side of the rib protrusion 53 contacts a side surface of another unit battery cell 20.

A series of recess portion 53a may be formed on side surfaces of the rib protrusion 53 to accommodate portions of the unit battery cells 20.

The recess portions 53a may be formed at opposite sides of the rib protrusion 53 such that the rib protrusion 53 has an undulating (e.g., serpentine) shape along a longitudinal direction thereof. For example, as illustrated in FIG. 4 and FIG. 5, the recess portions 53a may be alternately formed at different positions along opposite sides of the rib protrusion 53 along the longitudinal direction of the rib protrusion 53. Accordingly, the rib protrusion 53 may be formed to have a meandering shape (e.g., an undulating or serpentine shape) along the longitudinal direction of the rib protrusion 53.

As such, the rib protrusion 53 has a series of concave portions 53a formed at the side surfaces thereof, and thus the cooling energy of the cooling unit 30 may be effectively transferred to the unit battery cells 20 by increasing an area that is in surface contact with the side surface of the unit battery cells 20.

A protruding portion of the rib protrusion 53 may protrude to a height in contact with a portion of the side surface of the unit battery cells 20.

Accordingly, high-temperature heat generated during the operation of the unit battery cells 20 may be transferred to the cooling unit 30 through the bus bar plate 51 and the rib protrusion 53. As a result, the heat generated during the operation of the unit battery cells 20 may be effectively cooled by a heat transfer action between the bus bar plate 51 and the rib protrusion 53.

Figure 6:
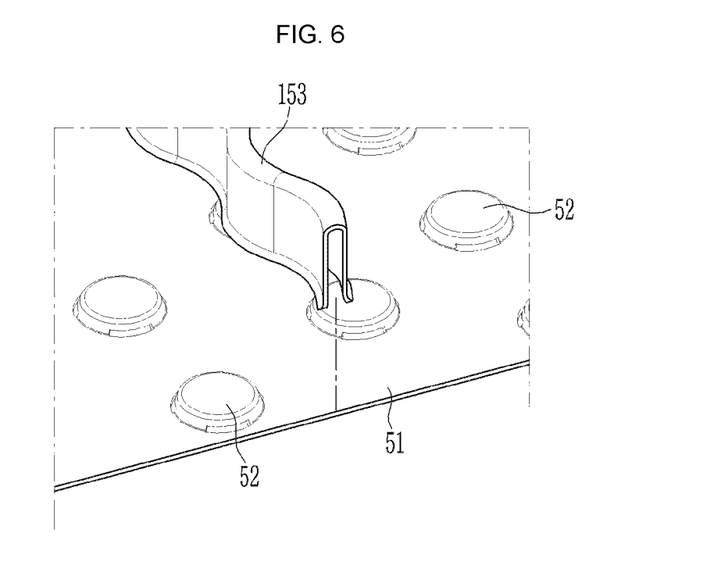
FIG. 6 illustrates a schematic perspective view of main parts of a second bus bar according to a second embodiment of the present disclosure.
Figure 7:
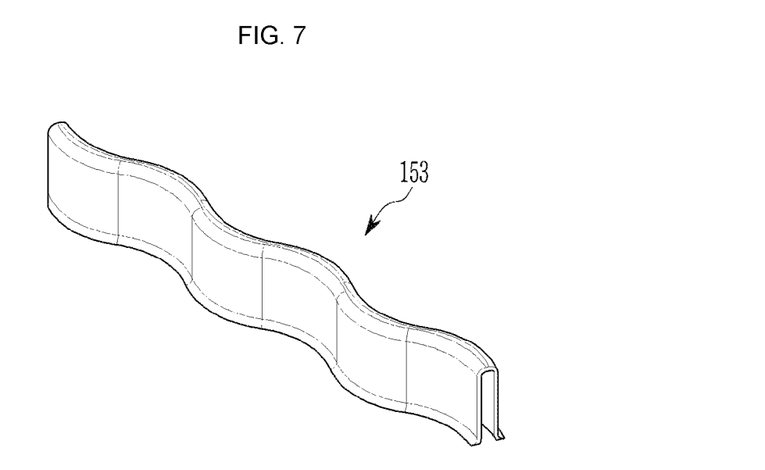
FIG. 7 illustrates a schematic perspective view showing a rib protrusion of the second bus bar illustrated in FIG. 6.

FIG. 6 illustrates a schematic perspective view of main parts of a second bus bar according to a second embodiment of the present disclosure, and FIG. 7 illustrates a schematic perspective view showing a rib protrusion of the second bus bar illustrated in FIG. 6. The same reference numerals as those of FIG. 1 to FIG. 5 denote the same or similar members having the same or similar functions. Hereinafter, detailed descriptions of the same reference numerals will be omitted.

As illustrated in FIG. 6 and FIG. 7, according to the second embodiment of the present disclosure, a rib protrusion 153 of the rechargeable battery pack may be coupled to the bus bar plate 51 of the second bus bar 50 (e.g., the rib protrusion 153 may be formed separate from the bus bar plate 51 and then subsequently coupled to the bus bar plate 51).

The bus bar plate 51 may be installed in a state of being in surface contact with the bottom plate 31 (see FIG. 3).

The terminal protrusions 52, which are electrically connected to the electrode terminals of the unit battery cells 20, may protrude from an upper surface of the bus bar plate 51.

A plurality of terminal protrusions 52 may protrude from the surface of the bus bar plate 51, and may be electrically connected to electrode terminals of the unit battery cells 20.

The rib protrusion 153 may be coupled to the bus bar plate 51 between the terminal protrusions 52 of the second bus bar 50 (e.g., the rib protrusion 153 may be coupled to the bus bar plate 51 between a first set of the terminal protrusions 52 and a second set of the terminal protrusions 52).

The rib protrusion 153 may be welded at a position between the terminal protrusions 52 of the bus bar plate 51. The rib protrusion 153 is not necessarily limited to being welded to the bus bar plate 51, and may be bonded thereto by an adhesive or coupled in any other suitable manner.

Accordingly, the rib protrusion 153 may be coupled in a protruding state to an appropriate position (an appropriate height) on the upper surface of the bus bar plate 51, and thus may stably contact a portion of the side surface of the unit battery cells 20 to perform a cooling action of the unit battery cells 20.

Figure 8:
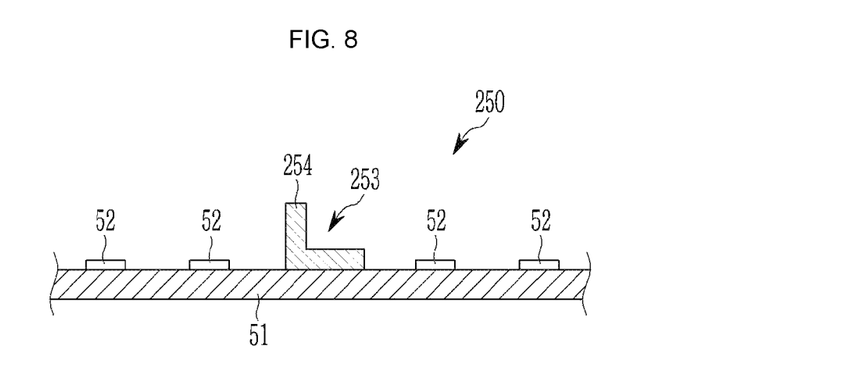
FIG. 8 illustrates a schematic cross-sectional view of main parts of a second bus bar according to a third embodiment of the present disclosure.

FIG. 8 illustrates a schematic cross-sectional view of main parts of a second bus bar according to a third embodiment of the present disclosure. The same reference numerals as those of FIG. 1 to FIG. 7 denote the same or similar members having the same or similar functions. Hereinafter, detailed descriptions of the same reference numerals will be omitted.

As illustrated in FIG. 8, according to the third embodiment of the present disclosure, a rib protrusion 253 of a second bus bar 250 of the rechargeable battery pack may have a bent portion 254 that is formed to be bent such that a lower surface thereof is coupled to an upper surface of the bus bar plate 51 and a first side thereof projects upward and is inserted into a position between the unit battery cells 20.

That is, the rib protrusion 253 may have an 'L'-shaped cross-section in a plane that is perpendicular to the longitudinal direction of the rib protrusion 253. In the illustrated embodiment, the rib protrusion 253 includes a horizontal leg that is coupled to the upper side of the bus bar plate 51 and a bent portion 254 (e.g., a vertical leg) extending upward from the horizontal leg. The bent portion 254 may be inserted into a position between the unit battery cells 20.

Accordingly, the bent portion 254 may be in contact with a portion of the side surface of the unit battery cells 20, and thus the unit battery cells 20 may be effectively cooled by a heat exchange action with the cooling unit 30.

Recess portions 53a may be formed on a side surface of the bent portion 254 to be in surface contact with a side surface of the round unit battery cells 20 as in the above-described exemplary embodiment.

Figure 9:
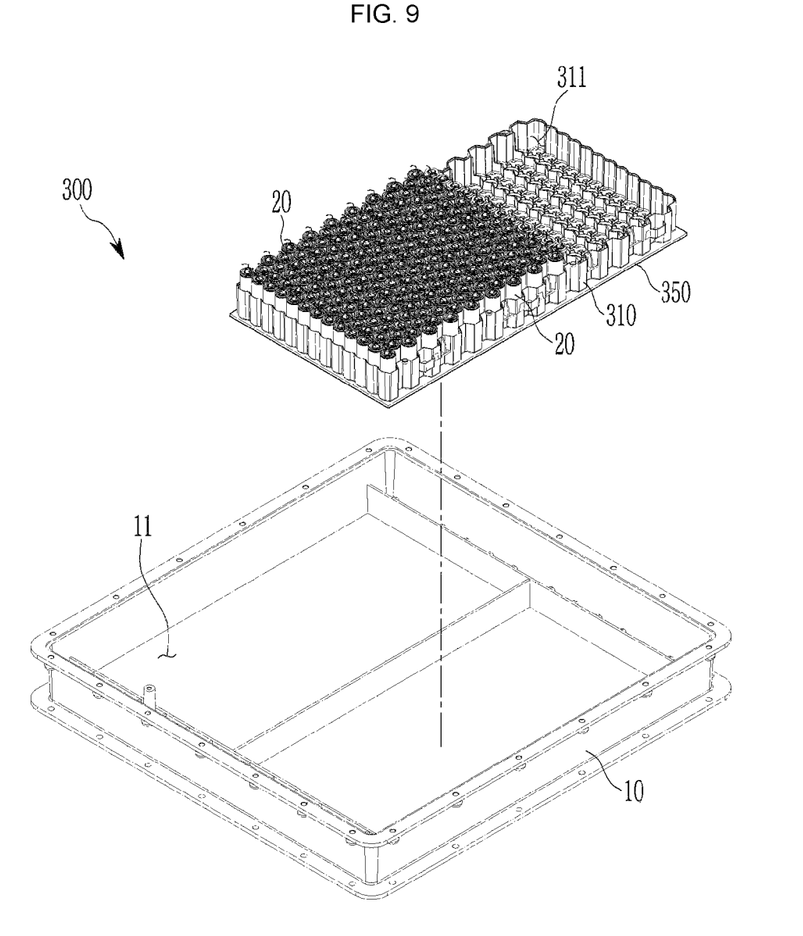
FIG. 9 illustrates a schematic perspective view showing a rechargeable battery pack according to a fourth embodiment of the present disclosure.
Figure 10:
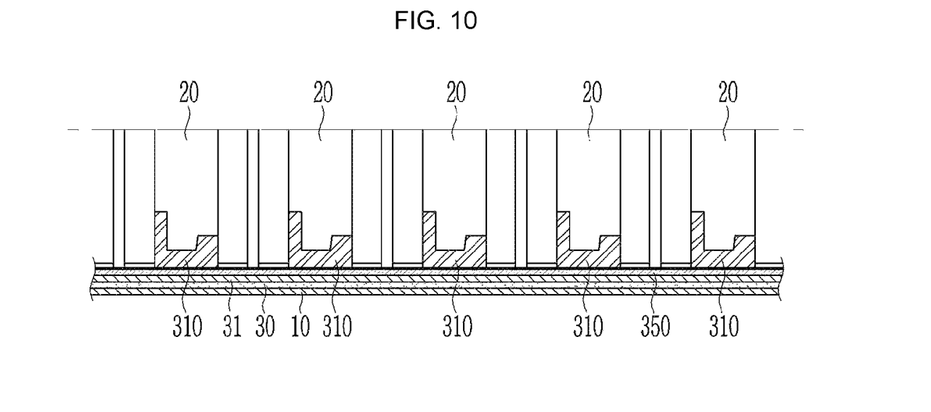
FIG. 10 illustrates a schematic cross-sectional view showing a state in which unit battery cells of FIG. 9 are attached to a lower portion thereof fixed by a holder.

FIG. 9 illustrates a schematic perspective view showing a rechargeable battery pack according to a fourth embodiment of the present disclosure, and FIG. 10 illustrates a schematic cross-sectional view showing a state in which unit battery cells of FIG. 9 are attached to a lower portion of the rechargeable battery pack fixed by a holder. The same reference numerals as those of FIG. 1 to FIG. 8 denote the same or similar members having the same or similar functions. Hereinafter, detailed descriptions of the same reference numerals will be omitted.

As illustrated in FIG. 9 and FIG. 10, according to the fourth embodiment of the present disclosure, in the rechargeable battery pack 300, the unit battery cells 20 may be fixed by a holder portion 310 inside the inner space 11 of the battery housing 10.

The holder portion 310 may have a plurality of through-holes 311 in which a plurality of unit battery cells 20 are disposed (or accommodated). These through-holes 311 may be formed to extend through upper and lower portions of the holder portion 310 so that the unit battery cells 20 may be inserted therein. The through-holes 311 may be independent (e.g., separate) of each other or may overlap each other.

Portions of the unit battery cells 20 may be inserted into the through holes 311 of the holder portion 310, and the others of the unit battery cells 20 may be fixed in a state of protruding from an upper portion of the through holes 311.

The holder portion 310 may be mounted on a second bus bar 350 while the unit battery cells 20 are fixed in position. In such an embodiment, the lower portion of the holder portion 310 may be coupled to the second bus bar 350.

The second bus bar 350 may be electrically connected to an electrode terminal of the unit battery cells 20 inserted into the through holes 311 through welding or the like.

The second bus bar 350 may be mounted in surface contact with a bottom plate 31 of the inner space 11 of the battery housing 10 in a state of being coupled (or integrally formed) to the holder portion 310 and the unit battery cells 20.

Accordingly, high-temperature heat of the unit battery cells 20 may be cooled by heat exchange with the cooling unit 30 through the second bus bar 350. In addition, the row of the unit battery cells 20 may be fixed in position through the holder portion 310 to facilitate a welding operation between the second bus bar 350 and the unit battery cells 20. In addition, the unit battery cells 20, the holder portion 310, and the second bus bar 350 may be integrated to improve an assembling property of the rechargeable battery pack.

Figure 11:
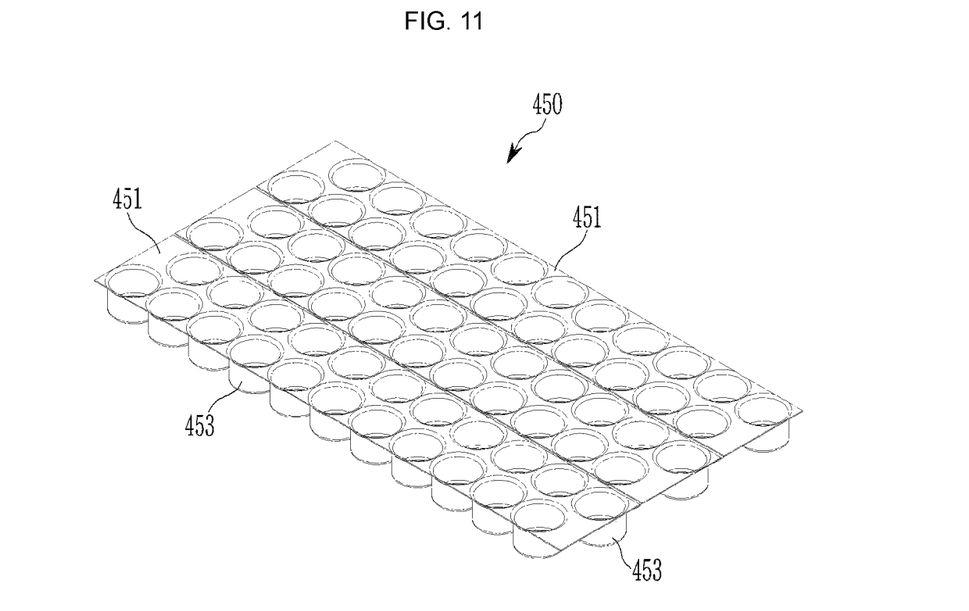
FIG. 11 illustrates a schematic perspective view showing a second bus bar according to a fifth embodiment of the present disclosure.
Figure 12:
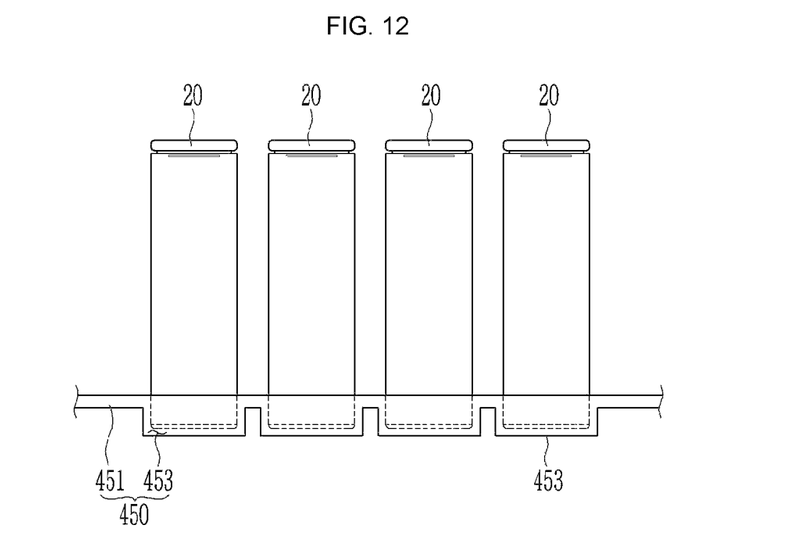
FIG. 12 illustrates a schematic side view showing a state in which lower portions of the unit battery cells are inserted into the second bus bar of FIG. 11.
Figure 13:
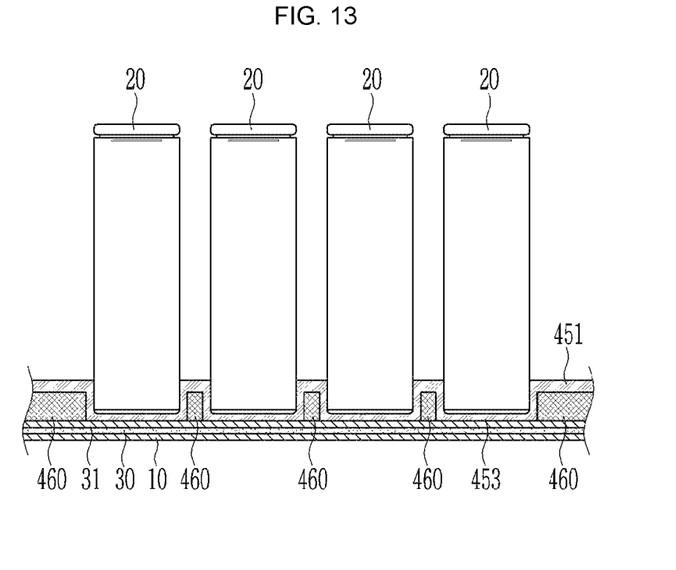
FIG. 13 illustrates a schematic cross-sectional view showing a state in which the lower portions of the unit battery cells are inserted into the second bus bar of FIG. 12 and positioned above a cooling unit of a battery housing.

FIG. 11 illustrates a schematic perspective view showing a second bus bar 450 according to a fifth embodiment of the present disclosure, FIG. 12 illustrates a schematic side view showing a state in which lower portions of the unit battery cells 20 are inserted into the second bus bar 450 of FIG. 11, and FIG. 13 illustrates a schematic cross-sectional view showing a state in which the lower portions of the unit battery cells 20 are inserted into the second bus bar 450 of FIG. 12 and positioned above a cooling unit 30 of a battery housing. The same reference numerals as those of FIG. 1 to FIG. 10 denote the same or similar members having the same or similar functions. Hereinafter, detailed descriptions of the same reference numerals will be omitted.

As illustrated in FIG. 11 to FIG. 13, according to the fifth embodiment of the present disclosure, the second bus bar 450 of the rechargeable battery pack may include: a bus bar plate 451 facing a bottom plate 31 of the inner space 11 of the battery housing 10; and a plurality of fixers 453 protruding downward away from a lower portion of the bus bar plate 451 and having interior spaces in which a bottom surface and a side surface of the unit battery cells 20 are partially positioned (or accommodated).

The bus bar plate 451 may be spaced apart from the bottom plate 31 of the inner space 11 of the battery housing 10 by a protruding distance of the fixers 453, and a plurality of fixers 453 into which the unit battery cells 20 are inserted (or accommodated) may be integrally formed with the bus bar plate 451.

The fixers 453 may be formed in a plurality of columns and rows in the bus bar plate 451, and may be formed in a pocket type configuration by punching the bus bar plate 451 or by any other suitable process.

That is, the fixers 453 may be formed to protrude from a lower portion of the bus bar plate 451 in a pocket type configuration, so that the lower portions of the unit battery cells 20 may be partially inserted or accommodated therein.

The fixers 453 may protrude from the lower portion of the bus bar plate 451 such that the lower portions of the unit battery cells 20 are inserted or accommodated therein. Lower surfaces of the fixers 453 may be in surface contact (e.g., direct surface contact) with the bottom plate 31 of the inner space 11 of the battery housing 10.

Accordingly, the high-temperature heat of the unit battery cells 20 may be readily transferred to the cooling unit 30 through the bottom plate 31 of the inner space 11 of the battery housing 10 in surface contact with the fixers 453, thereby achieving effective cooling of the unit battery cells 20.

Additionally, in one or more embodiments, a filler 460 may be filled between the bus bar plate 451 and the bottom plate 31 of the inner space 11 of the battery housing 10.

That is, the filler 460 may be filled between the bus bar plate 451, the bottom plate 31 of the inner space 11 of the battery housing 10, and outer surfaces of the fixers 453 protruding downward of the bus bar plate 451.

The filler 460 may be formed by using an adhesive material that facilitates heat transfer and undergoes curing by heat. In the present embodiment, the filler 460 may be formed by using a thermal glue, but is not limited thereto, and the filler 460 may be changed to a predetermined adhesive material such as a silicone adhesive.

As such, the filler 460 is filled between the bus bar plate 451 and the bottom plate 31 of the inner space 11 of the battery housing 10, and thus the high-temperature heat of the unit battery cell 20 is transferred to the cooling unit 30 through the filler 460 to enable effective cooling of the unit battery cells 20.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| | |
|---|---|
| 10 battery housing | 11 inner space |
| 20 unit battery cell | 30 cooling unit |
| 31 bottom base plate | 40 first bus bar |
| 43 wire member | 50 second bus bar |
| 51 bus bar plate | 52 terminal protrusion |
| 53a recess portion | 53, 153, 253 rib protrusion |
| 254 bent portion | 310 holder portion |
| 311 through-hole | 350, 450 second bus bar |
| 451 bus bar plate | 453 fixer |
| 460 filler | |

What is claimed is:

1. A rechargeable battery pack comprising:
a battery housing comprising an inner space;
a plurality of unit battery cells accommodated in the inner space;
a first bus bar configured to electrically connect the unit battery cells above the unit battery cells;
a second bus bar configured to electrically connect the unit battery cells under the unit battery cells and contact a bottom plate of the battery housing in the inner space; and
a cooling unit in the battery housing under the second bus bar configured to accommodate a cooling medium to flow therein for cooling the unit battery cells,
wherein the second bus bar contacts lower surfaces of the unit battery cells,
wherein the second bus bar includes a rib protrusion comprising a plurality of recesses alternately curving in opposite directions and contacting a plurality of side portions of a plurality of side surfaces of the unit battery cells,
wherein a height of the rib protrusion is greater than a width of the rib protrusion,
wherein the rib protrusion extends lengthwise and has an undulating shape along a longitudinal direction of the rib protrusion,
wherein the second bus bar includes a plurality of terminal protrusions electrically connected to electrode terminals of the unit battery cells, and
wherein the plurality of terminal protrusions is arranged in staggered rows and the plurality of terminal protrusions in one of the staggered rows is aligned with the plurality of recesses in the rib protrusion.

2. The rechargeable battery pack of claim 1, wherein the second bus bar includes:
a bus bar plate positioned on the bottom plate of the battery housing in the inner space; and
wherein the plurality of terminal protrusions protrudes from the bus bar plate,
wherein the rib protrusion protrudes from an upper portion of the bus bar plate.

3. The rechargeable battery pack of claim 2, wherein the rib protrusion is integrally formed with the bus bar plate.

4. The rechargeable battery pack of claim 2, wherein the rib protrusion is coupled to the upper portion of the bus bar plate.

5. The rechargeable battery pack of claim 2, wherein the rib protrusion has a lower surface that is coupled to the bus bar plate, and wherein a first side of the rib protrusion has a bent portion that is bent to contact the plurality of side portions of the plurality of side surfaces of the plurality of unit battery cells.

6. The rechargeable battery pack of claim 1, wherein the cooling unit is a cooling channel formed inside the bottom plate of the battery housing.

* * * * *